United States Patent
Ito et al.

(10) Patent No.: US 7,454,635 B2
(45) Date of Patent: Nov. 18, 2008

(54) POWER SAVING DEVICE AND ELECTRONIC DEVICE USING THE SAME

(75) Inventors: Kazunari Ito, Neyagawa (JP); Tadaharu Sunaga, Neyagawa (JP)

(73) Assignee: ONKYO Corporation, Neyagawa (JP)

(*) Notice: Subject to any disclaimer, the term of this patent is extended or adjusted under 35 U.S.C. 154(b) by 519 days.

(21) Appl. No.: 11/190,683

(22) Filed: Jul. 27, 2005

(65) Prior Publication Data
US 2006/0156047 A1    Jul. 13, 2006

(30) Foreign Application Priority Data
Jan. 7, 2005  (JP) ............................. 2005-003223

(51) Int. Cl.
*G06F 1/32*  (2006.01)
(52) U.S. Cl. ...................... 713/322; 713/320
(58) Field of Classification Search .......... 713/300–324
See application file for complete search history.

(56) References Cited

U.S. PATENT DOCUMENTS

| | | | | |
|---|---|---|---|---|
| 4,649,373 | A * | 3/1987 | Bland et al. | 341/22 |
| 5,710,911 | A * | 1/1998 | Walsh et al. | 713/500 |
| 6,225,916 | B1 * | 5/2001 | Sugimoto et al. | 340/825.69 |
| 6,557,063 | B1 * | 4/2003 | Wang et al. | 710/110 |
| 6,747,567 | B2 | 6/2004 | Amano et al. | |
| 2002/0091961 | A1 * | 7/2002 | Inoue | 713/601 |
| 2004/0059531 | A1 * | 3/2004 | Tomida et al. | 702/79 |

FOREIGN PATENT DOCUMENTS

| | | |
|---|---|---|
| JP | 59-079325 | 5/1984 |
| JP | 61-220016 | 9/1986 |
| JP | 07-087570 | 3/1995 |
| JP | 09-191569 | 7/1997 |
| JP | 10-210563 | 8/1998 |
| JP | 3065058 | 10/1999 |
| JP | 2001-014073 | 1/2001 |
| JP | 2001-268788 | 9/2001 |

* cited by examiner

*Primary Examiner*—Dennis M Butler
(74) *Attorney, Agent, or Firm*—Renner, Otto, Boisselle & Sklar, LLP

(57) ABSTRACT

A microcomputer 11 stays in a power saving mode until a remote control signal is input and a first interrupt signal is input to an interrupt terminal 14. When the first interrupt signal is input, the microcomputer 11 performs an intermittent operation in which the power saving mode and the normal mode are periodically alternated with each other, and ends the intermittent operation when the remote control signal is received completely. After the intermittent operation, the microcomputer 11 stays in the normal mode if the remote control signal is a power-requesting signal and stays in the power saving mode otherwise.

12 Claims, 3 Drawing Sheets

POWER SAVING DEVICE AND ELECTRONIC DEVICE USING THE SAME

BACKGROUND OF THE INVENTION

1. Field of the Invention

The present invention relates to a power saving device in which a microcomputer is shut down in a standby state.

2. Description of the Related Art

An electronic device such as an AV device has a standby state, where power is supplied only to the microcomputer and to the peripheral circuits thereof so that the power of the device can be turned back ON in response to a user's operation of a remote control even when the power of the device is OFF. Recently, there is a demand for further reducing the standby power consumption, i.e., the amount of power to be consumed in a standby state. In view of such a demand, the microcomputer has a power saving mode in which the microcomputer itself is shut down when the microcomputer has no process to execute. Then, in response to a remote control signal, an interrupt signal is input to an interrupt terminal of the microcomputer for triggering a transition from the power saving mode to the normal mode. If the remote control signal is a signal that does not require the transition to the normal mode (e.g., a "Stop" signal of a CD player), the microcomputer transitions from the normal mode back to the power saving mode. However, whether the remote control signal does or does not require the transition to the normal mode can be determined only after receiving the remote control signal completely. With a conventional method, the microcomputer stays in the normal mode while analyzing the remote control signal. Therefore, such a conventional method fails to save the power consumption during the remote control signal receiving period.

Patent Document 1 (Japanese Laid-Open Patent Publication No. 2001-14073) discloses a device in which the microcomputer in the standby state performs an intermittent operation in which the power saving mode and the normal mode are alternated with each other until a remote control signal is received. When a remote control signal is received, the normal mode is extended (continued) to analyze the remote control signal. With this device, however, the microcomputer is in the normal mode while analyzing a remote control signal, thereby failing to save the power consumption during the remote control signal receiving period. Moreover, since this device performs the intermittent operation and repeats the normal mode at regular intervals until a remote control signal is received, thereby increasing the average power consumption. The device performs the intermittent operation until a remote control signal is received because the device aims at making the transition from the power saving mode to the normal mode by detecting the input of the remote control signal without using an interrupt terminal.

Patent Document 2 (Japanese Utility Model No. 3065058) discloses a device having two different modes, i.e., the normal mode and the power saving mode in which the power consumption is smaller than that in the normal mode. When making the transition from the power saving mode to the normal mode, the device alternately repeats the normal mode and the power saving mode and then transitions to a continuous normal mode. The average current consumption value during the period in which the normal mode and the power saving mode are alternately repeated is smaller than the current consumption value in the normal mode. The device can gradually increase the average power consumption by gradually increasing the period of the normal mode in the intermittent operation. With this device, the intermittent operation is performed after the remote control signal is received completely. This delays the time at which an operation specified by the remote control signal is started. Another problem is that the power consumption during the remote control signal receiving period cannot be reduced.

SUMMARY OF THE INVENTION

It is therefore an object of the present invention to provide a power saving device capable of desirably reducing the power consumption of a microcomputer in a standby state.

A device of the present invention is a power saving device operable in a power saving mode and in a normal mode, including a controller including an interrupt terminal for receiving a first interrupt signal based on an input remote control signal. When the first interrupt signal is input to the controller via the interrupt terminal, the controller performs an intermittent operation in which the power saving mode and the normal mode are periodically alternated with each other. The controller ends the intermittent operation when the remote control signal is received completely.

The controller periodically repeats the power saving mode and the normal mode while a remote control signal is being received. Therefore, the controller can analyze the remote control signal during the normal mode, while reducing the power consumption during the power saving mode. Thus, it is possible to desirably reduce the average power consumption during the remote control signal receiving period. The intermittent operation is ended when the remote control signal is received completely, and the operation can immediately transition to the power saving mode if the remote control signal contains no instruction that needs to be executed. Thus, it is possible to further reduce the power consumption. It is determined that a remote control signal is received completely not only when the remote control signal is received normally and completely, but it is assumed that a remote control signal is received completely also when the remote control signal is discarded for reasons such as the leader code (or the custom code) being invalid or an interference signal contaminating the remote control signal, whereby the code cannot be analyzed properly.

In a preferred embodiment, the controller stays in the power saving mode until the first interrupt signal is input to the controller via the interrupt terminal.

Therefore, the controller always stay in the power saving mode until a remote control signal is input, whereby it is possible to further reduce the standby power consumption.

In a preferred embodiment, if the remote control signal is a power-requesting signal, the controller stays in the normal mode after the intermittent operation, and if the remote control signal is a non-power-requesting signal, the controller stays in the power saving mode after the intermittent operation.

If the remote control signal is a power-requesting signal, the controller transitions to the normal mode after the intermittent operation, whereby the controller can perform an operation based on the remote control signal. If the remote control signal is a non-power-requesting signal, the controller transitions to the power saving mode after the intermittent operation, whereby it is possible to further reduce the power consumption.

In a preferred embodiment, the controller includes a main circuit, and a timer circuit for giving a second interrupt signal to the main circuit when the timer circuit has counted a predetermined amount of time. The intermittent operation includes: a step in which the timer circuit counts the predetermined amount of time; a step in which the controller transitions from the normal mode to the power saving mode; a step in which the timer circuit gives the second interrupt signal to the main circuit when the timer circuit has counted the predetermined amount of time; and a step in which the controller transitions from the power saving mode to the normal mode when the main circuit receives the second interrupt signal.

When the first interrupt signal is input to the interrupt terminal, the controller transitions to the normal mode, and the timer circuit starts the count operation. Then, the controller analyzes the remote control signal during the normal mode, after which the controller transitions to the power saving mode. The timer circuit gives the second interrupt signal to the main circuit when the timer circuit has counted the predetermined amount of time, and the controller transitions to the normal mode in response to the second interrupt signal. The controller can perform the intermittent operation because the controller can automatically transition to the power saving mode and to the normal mode in response to the second interrupt signal from the timer circuit.

In a preferred embodiment, the controller includes a main circuit, a timer circuit for giving a second interrupt signal to the main circuit when the timer circuit has counted a predetermined amount of time, and an oscillator circuit for supplying a clock signal to the main circuit and the timer circuit. The power saving mode until the first interrupt signal is input to the interrupt terminal is a first power saving mode in which the oscillator circuit does not supply a clock signal to the main circuit or the timer circuit. The power saving mode during the intermittent operation is a second power saving mode in which the oscillator circuit does not supply the clock signal to the main circuit but supplies the clock signal to the timer circuit.

Until a remote control signal is input, the controller is in the first power saving mode in which the oscillator circuit does not supply the clock signal to the main circuit or the timer circuit. This is because the timer circuit does not need to be operated. Therefore, the controller can desirably reduce the power consumption. During the intermittent operation, the controller is in the second power saving mode in which the clock signal is not supplied to the main circuit but is supplied to the timer circuit. Therefore, it is possible to desirably reduce the power consumption by not supplying the clock signal to the main circuit, while the timer circuit can perform the count operation as the clock signal is supplied to the timer circuit. Thus, it is possible to desirably reduce the average power consumption of the controller.

Another device of the present invention is a power saving device operable in a power saving mode and in a normal mode, including a controller including an interrupt terminal for receiving a first interrupt signal based on an input remote control signal. The controller stays in the power saving mode until the first interrupt signal is input to the controller via the interrupt terminal. When the first interrupt signal is input to the controller via the interrupt terminal, the controller performs an intermittent operation in which the power saving mode and the normal mode are periodically alternated with each other.

The controller stays in the power saving mode until a remote control signal is input. The controller periodically repeats the power saving mode and the normal mode while a remote control signal is being received. Therefore, the controller can analyze the remote control signal during the normal mode, while reducing the power consumption during the power saving mode. Thus, it is possible to desirably reduce the average power consumption of the controller.

DETAILED DESCRIPTION OF THE PREFERRED EMBODIMENTS

Figure 1:
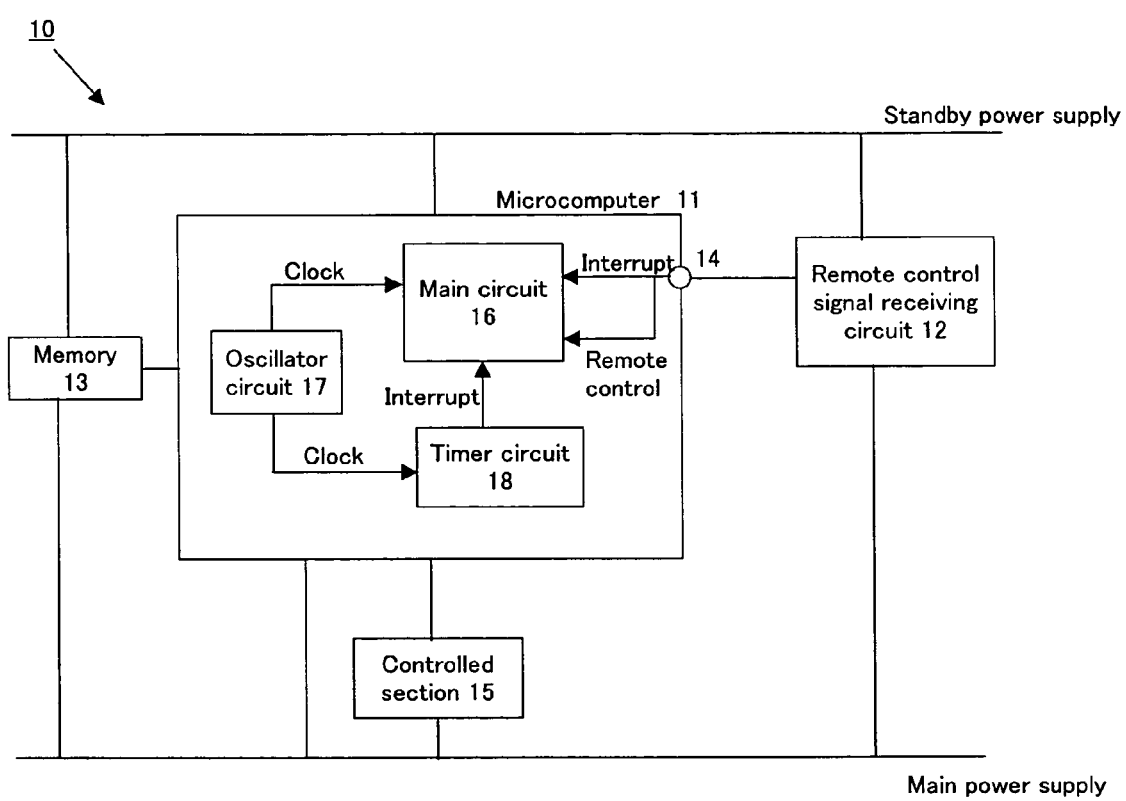
FIG. 1 is a block diagram showing a power saving device according to a preferred embodiment of the present invention.

While a preferred embodiment of the present invention will now be described with reference to the drawings, it is understood that the present invention is not limited thereto. FIG. 1 is a schematic block diagram showing a power saving device 10 according to the preferred embodiment of the present invention. The power saving device 10 includes a controller 11 and a remote control signal receiving circuit 12, and transitions from the power saving mode to the normal mode in response to a received interrupt signal. The power saving device 10 can be used in a common electronic device such as a CD player.

The controller 11 controls the overall operation of an electronic device (e.g., a CD player) with which the power saving device 10 can be used (i.e., it controls a controlled section 15), and is typically a microcomputer, for example. The microcomputer 11 includes a memory 13 (e.g., a ROM and/or a RAM), which may be provided in the microcomputer 11 or may be provided outside and connected to the microcomputer 11 via a bus, or the like. The microcomputer 11 executes various programs stored in the memory 13 to perform various operations (e.g., bringing a CD player to the Play mode). The microcomputer 11 includes a main circuit 16 for controlling the controlled section 15, an oscillator circuit 17 and a timer circuit 18. The oscillator circuit 17 produces a clock signal, and supplies the produced clock signal to the main circuit 16 and the timer circuit 18. The timer circuit 18 receives the clock signal from the oscillator circuit 17, and counts a predetermined amount of time based on the clock signal. Specifically, the timer circuit 18 counts a predetermined amount of time by counting the number of pulses of the clock signal. Upon completion of the counting of a predetermined amount of time, the timer circuit 18 gives a second interrupt signal to the main circuit 16. The second interrupt signal is used for triggering the transition to the normal mode in the intermittent operation to be described later. The main circuit 16 receives the clock signal from the oscillator circuit 17 and performs various operations. Moreover, the main circuit 16 instructs the oscillator circuit 17 to stop the supply of the clock signal, and/or instructs the timer circuit 18 to start/stop the count operation.

The power saving device 10 has a so-called "standby mode" in which the power is supplied only to the microcomputer 11, the memory 13 and the remote control signal receiving circuit 12 so that the main power can be turned ON by a user's operation of the remote control. Specifically, the main power supply is electrically connected to the power saving device 10 as a whole, whereas the standby power supply is electrically connected only to the microcomputer 11, the memory 13 and the remote control signal receiving circuit 12. In the standby state, the main power is OFF, and only the standby power is ON. An OFF state as used herein refers to a state where the power is not being supplied as it is stopped by a switch (not shown), for example, being open, and an ON state as used herein refers to a state where the power is being supplied through the switch being closed.

The modes of operation of the microcomputer 11 include the normal mode and the power saving mode. The normal mode is a state where the microcomputer 11 can perform operations, and more specifically a state where a clock signal is supplied from the oscillator circuit 17 to the main circuit 16. The power saving mode is a state where the microcomputer 11 is shut down, thereby further reducing the power consumption. Specifically, the power saving mode is a state where the clock signal is not supplied from the oscillator circuit 17 to the main circuit 16. Moreover, there are two different power saving modes, i.e., a first power saving mode in which the supply of the clock signal to the timer circuit 18 is also stopped (in this mode, the oscillation of the oscillator circuit 17 itself may be shut down), and a second power saving mode in which the clock signal is supplied to the timer circuit 18. In the first power saving mode in which the clock signal is not supplied to the timer circuit 18, the power consumption can be further reduced. While the microcomputer 11 can analyze the remote control signal and perform various operations based on the remote control signal in the normal mode, the microcomputer 11 cannot perform these operations in the power saving mode. Therefore, the microcomputer 11 is always in the normal mode while it is not on standby (i.e., in the power-ON state), whereas the microcomputer 11 may be either in the power saving mode or in the normal mode while it is on standby. The presence/absence of the clock signal from the oscillator circuit 17 is controlled as follows. The supply of the clock signal from the oscillator circuit 17 to the main circuit 16 and/or the timer circuit 18 is stopped by an instruction from the main circuit 16 (e.g., by opening a switch provided between the oscillator circuit 17 and the main circuit 16 and/or the timer circuit 18). The supply of the clock signal from the oscillator circuit 17 to the main circuit 16 and/or the timer circuit 18 is started by a first interrupt signal or a second interrupt signal (e.g., by closing a switch provided between the oscillator circuit 17 and the main circuit 16 and/or the timer circuit 18).

The microcomputer 11 has an interrupt terminal 14. The interrupt terminal 14 is connected to the remote control signal receiving circuit 12, and a remote control signal input to the remote control signal receiving circuit 12 is converted to an electric signal and input to the interrupt terminal 14. The signal input to the interrupt terminal 14 is supplied to the main circuit 16 as a first interrupt signal, and is also supplied to the main circuit 16 as a remote control signal. When the first interrupt signal is received while the microcomputer 11 is staying in the power saving mode, the microcomputer 11 transitions from the power saving mode to the normal mode. Specifically, when the microcomputer 11 being in the power saving mode receives the first interrupt signal via the interrupt terminal 14, the microcomputer 11 is interrupted at an edge of the first interrupt signal and transitions to the normal mode.

Figure 2:
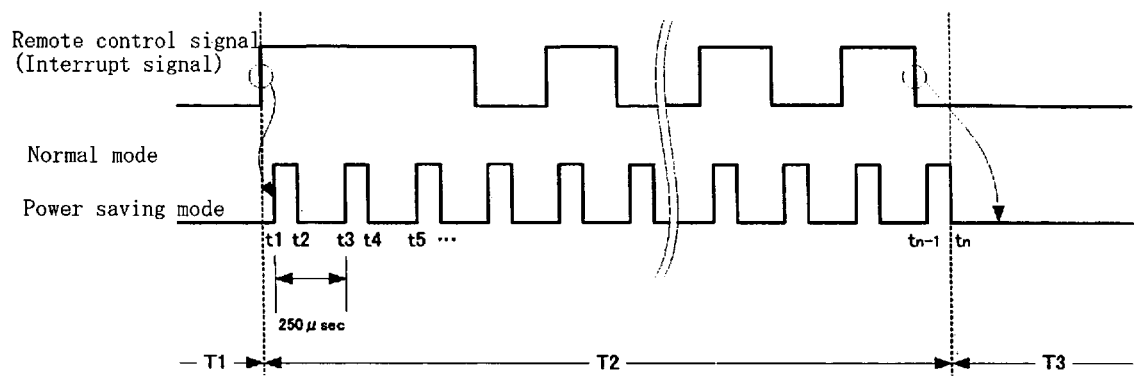
FIG. 2A and FIG. 2B are timing charts each showing an operation of the power saving device of the preferred embodiment.
Figure 2:
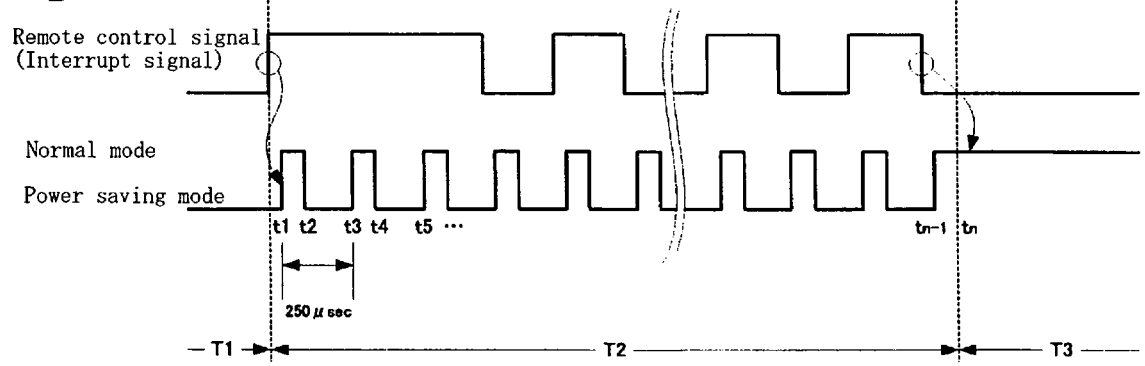

FIG. 2A and FIG. 2B are timing charts illustrating the remote control signal (first interrupt signal) and the operation state of the microcomputer 11. In the standby state, the microcomputer 11 stays in the first power saving mode until the microcomputer 11 receives a remote control signal (period T1). In the standby state, while a received remote control signal is being analyzed, the microcomputer 11 periodically repeats the normal mode and the second power saving mode (this operation is herein referred to as an "intermittent operation") (period T2). Thus, a remote control signal is analyzed while the operation is in the normal mode during the intermittent operation. The microcomputer 11 analyzes a remote control signal by determining the level (either high or low) of the remote control signal. By setting the period of the intermittent operation to be smaller than the period of the code of the remote control signal (e.g., by setting it to be 250 microseconds), it is possible to accurately analyze the remote control signal even if the remote control signal is analyzed only in the normal mode and it is not analyzed in the second power saving mode. Then, after exiting the standby state (i.e., in the power-ON state), the microcomputer 11 stays in the normal mode irrespective of whether a remote control signal is being received (period T3 of FIG. 2B). In period T3 of FIG. 2A, since the remote control signal is a non-power-requesting signal, the device does not exit the standby state, and the microcomputer 11 stays in the first power saving mode (the details will be described later).

Figure 3:
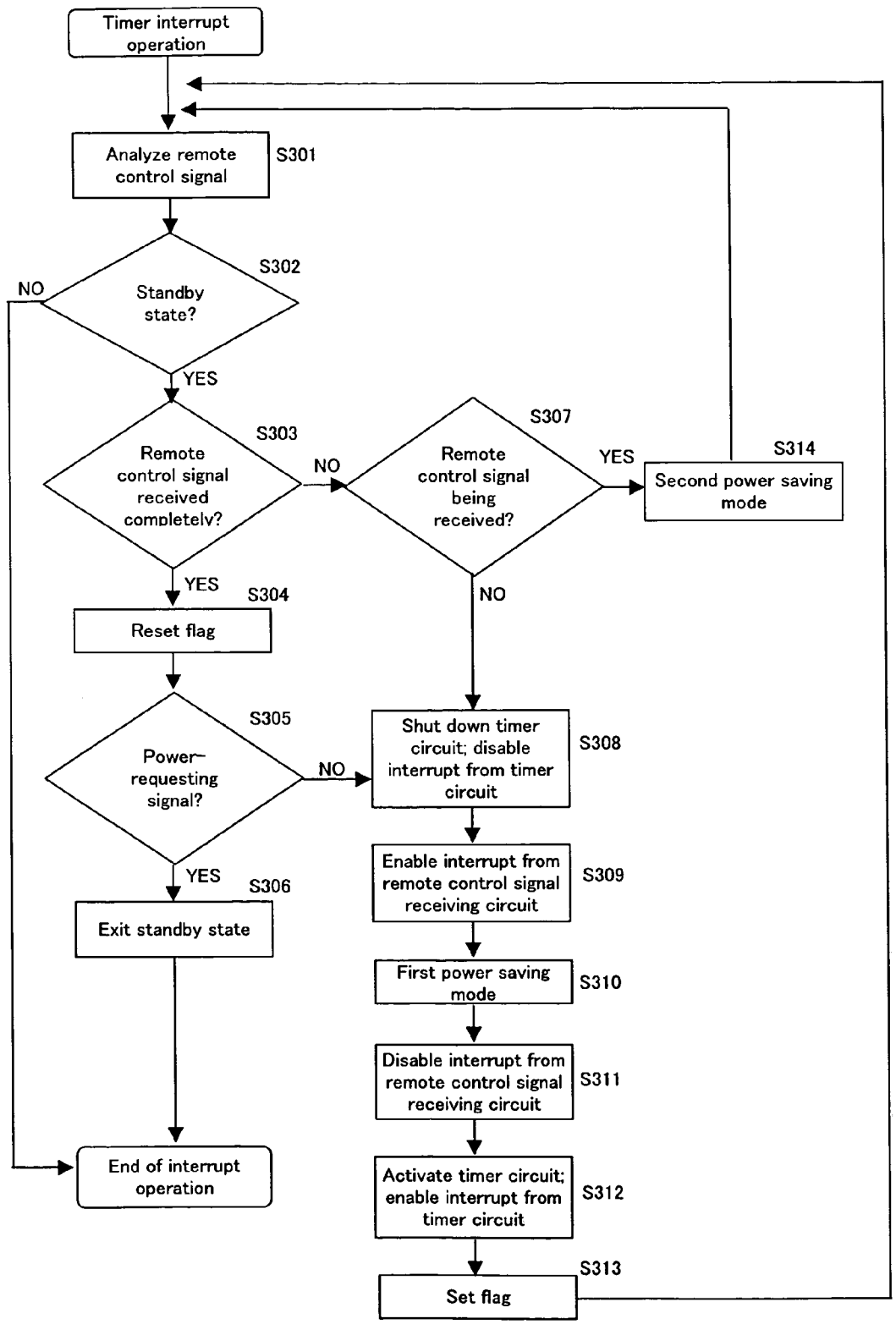
FIG. 3 is a flow chart showing an operation of the power saving device of the preferred embodiment.

The operation of the power saving device 10 will now be described in detail with reference to FIG. 2A, FIG. 2B and FIG. 3. FIG. 3 is a flow chart showing an operation of the power saving device 10 (interrupt routine). First, referring to FIG. 2A, an operation of the microcomputer 11 in the standby state (periods T1 and T2) will be described. The transition from the normal mode to the power saving mode is made as follows. When the device is in the standby state (YES in S302) and no remote control signal is being received (NO in S303 and S307), the microcomputer 11 shuts down the timer circuit 18 so that the second interrupt signal is not received from the timer circuit 18 (S308). Then, the microcomputer 11 enables an interrupt circuit therein so that the first interrupt signal can be received from the remote control signal receiving circuit 12 via the interrupt terminal 14 (S309). Then, the main circuit 16 instructs the oscillator circuit 17 to stop the supply of the clock signal to the main circuit 16 and the timer circuit 18, and the microcomputer 11 thus enters the first power saving mode (S310). As a result, in period T1, the microcomputer 11 stays in the first power saving mode (S310) until a remote control signal is received by the remote control signal receiving circuit 12 (i.e., until the first interrupt signal is input to the main circuit 16 via the interrupt terminal 14). This is a state where the clock signal is not supplied to the main circuit 16 or the timer circuit 18, and is a state where the power consumption of the microcomputer 11 is minimized.

The operation in period T2, where a remote control signal is being received, will now be described. The remote control signal receiving circuit 12 converts a received remote control signal to an electric signal, and passes the signal to the interrupt terminal 14. As the first interrupt signal is input to the main circuit 16 from the remote control signal receiving circuit 12 via the interrupt terminal 14, the microcomputer 11 transitions from the first power saving mode to the normal mode (time t1). Specifically, the first interrupt signal closes a switch (not shown) between the oscillator circuit 17 and the main circuit 16 (and the timer circuit 18), whereby the clock signal is supplied from the oscillator circuit 17. The presence/absence of the first interrupt signal is determined based on an edge (rising edge or falling edge) of the first interrupt signal. Thereafter, the microcomputer 11 disables the interrupt circuit therein so that the main circuit 16 will not receive the first interrupt signal via the interrupt terminal 14 (S311). Then, the count operation of the timer circuit 18 is started so as to count a predetermined amount of time (e.g., 250 microseconds) based on the clock signal from the oscillator circuit 17 (S312). Moreover, the microcomputer 11 enables the interrupt circuit therein so that the second interrupt signal can be received from the timer circuit 18 (S312). As will be described later, the timer circuit 18 gives an interrupt signal to the main circuit 16 each time the timer circuit 18 counts 250 microseconds. Then, the microcomputer 11 sets a flag indicating that a remote control signal is being received (S313).

The main circuit 16 of the microcomputer 11 analyzes the code of the remote control signal (S301). The code of a remote control signal is typically analyzed by determining the level (either high or low) of the remote control signal. Then, the microcomputer 11 determines whether or not the device is in the standby state (S302). Since the device is in the standby state (YES in S302) in the illustrated example, the microcomputer 11 then determines whether or not the remote control signal has been received completely by, for example, checking the number of bits of the received remote control signal (S303). In other words, the microcomputer 11 determines whether or not the analysis of the remote control signal has been completed. At this point, the remote control signal has not been received completely (NO in S303). Therefore, the microcomputer 11 determines whether or not the remote control signal is being received based on the flag (S307). Since the flag has been set in S313 (YES in S307), the main circuit 16 instructs the oscillator circuit 17 to stop only the supply of the clock signal to the main circuit 16, whereby the microcomputer 11 transitions to the second power saving mode at time t2 (S314). Thus, while the clock signal is not supplied to the main circuit 16, the clock signal is supplied to the timer circuit 18. This is done so that the timer circuit 18 continues the count operation. The power consumption in this mode of operation is lower than that in the normal mode but is slightly larger than that in the first power saving mode of S310. Since the count operation of the timer circuit 18 is started in S312, the second interrupt signal is input from the timer circuit 18 to the main circuit 16 at time t3 (250 microseconds after time t1), whereby the microcomputer 11 transitions from the second power saving mode to the normal mode. Specifically, the second interrupt signal closes a switch (not shown) between the oscillator circuit 17 and the main circuit 16, whereby the clock signal is supplied from the oscillator circuit 17.

Thus, in the period t1-t2, the microcomputer 11 is in the normal mode and analyzes the code of the remote control signal, whereas in the period t2-t3, the microcomputer 11 is in the second power saving mode and shut down, thereby saving the power consumption. The period t1-t2 is an amount of time required for the microcomputer 11 to perform S301, S302, S303, S307 and S314, and is 50 microseconds, for example. The shorter this time period is, the shorter a normal mode period is, thus further reducing the average power consumption in period T2.

The microcomputer 11 analyzes the code of the remote control signal at time t3 (S301), and it is determined that the device is in the standby state (YES in S302), that the remote control signal has not been received completely (NO in S303), and that the remote control signal is being received (YES in S307), whereby the microcomputer 11 transitions to the second power saving mode at time t4 (S314). Since the count operation of the timer circuit 18 is started in S312, the second interrupt signal is input to the main circuit 16 from the timer circuit 18 at time t5 (250 microseconds after time t3), whereby the microcomputer 11 transitions to the normal mode. Thus, in the period t3-t4, the microcomputer 11 is in the normal mode and analyzes the remote control code, whereas in the period t4-t5, the microcomputer 11 is in the second power saving mode and shut down. The operation as described above is repeated until a remote control signal is received completely (i.e., until the determination result in S303 is YES), wherein the microcomputer 11 repeats the normal mode and the second power saving mode with a period of 250 microseconds.

The operation after the analysis of the remote control signal (period T3) will now be described. FIG. 2A shows a case where the remote control signal is a non-power-requesting signal, and FIG. 2B is a case where the remote control signal is a power-requesting signal (note that the operation in FIG. 2A is the same as that in FIG. 2B in periods T1 and T2). A power-requesting signal as used herein refers to a signal in response to which the main circuit 16 needs to activate the controlled section 15 (e.g., "Power-ON/Standby", "Tray Open/Close" and "Play" of a CD player). In other words, a power-requesting signal is a signal in response to which the device needs to exit the standby state and be turned ON. A non-power-requesting signal as used herein refers to a signal in response to which the main circuit 16 does not need to activate the controlled section 15 (e.g., "Stop" and "Skip" of a CD player). In other words, a non-power-requesting signal is a signal in response to which the device does not need to exit the standby state.

The case of FIG. 2A will be first described. The microcomputer 11 analyzes the remote control signal at time tn−1 (S301) and, if it is determined that the remote control signal has been received completely (YES in S303), resets the flag (which has been set in S313) (S304), and it is determined whether or not the remote control signal is a power-requesting signal based on the result of the analysis in S301 (S305). Since the remote control signal is a non-power-requesting signal in the illustrated example (NO in S305), the microcomputer 11 shuts down the count operation of the timer circuit 18 and disables the interrupt circuit therein so that the second interrupt signal will not be received from the timer circuit 18 (S308). Then, the microcomputer 11 enables the interrupt circuit therein so that the first interrupt signal can be received from the remote control signal receiving circuit 12 via the interrupt terminal 14 (S309). Then, the microcomputer 11 transitions to the first power saving mode at time tn (S310). Therefore, in the case of FIG. 2A, the intermittent operation is performed only while a remote control signal is being received, and the microcomputer 11 transitions back to the first power saving mode after the intermittent operation. Thus, if the remote control signal is a non-power-requesting signal, the device does not exit the standby state and the microcomputer 11 stays in the first power saving mode.

The case of FIG. 2B will now be described. If the remote control signal is determined to be a power-requesting signal based on the result of the analysis in S301 (YES in S305), the microcomputer 11 exits the standby state and is turned ON (S306). Thus, in this case, the microcomputer 11 stays in the normal mode after time tn−1. Therefore, in the case of FIG. 2B, the intermittent operation is performed only while a remote control signal is being received, and the microcomputer 11 stays in the normal mode after the intermittent operation. Thus, if the remote control signal is a power-requesting signal, the device transitions from the standby state to the power-ON state, and the microcomputer 11 stays in the normal mode thereafter.

If a remote control signal is received in the power-ON state (where the device is not on standby), it is determined in S302 that the microcomputer 11 is not in the standby state, thereby exiting the interrupt operation.

It is determined in S303 of FIG. 3 that a remote control signal has been received completely even in cases other than when the remote control signal is received normally and completely. For example, when it is determined that a remote control signal is not a valid remote control signal, the remote control signal is discarded, in which case it is determined in S303 that a remote control signal has been received completely. Also in this case, it is determined in S305 that the remote control signal is a non-power-requesting signal, whereby the microcomputer 11 transitions to the first power saving mode (S310). Note that a remote control signal being invalid means that the leader code or the custom code of the remote control signal is invalid. A leader code is a code provided for distinguishing a remote control signal of an intended standard from those of different standards or interference signals other than remote control signals. A custom code is a code provided for distinguishing a remote control signal from an intended remote control transmitter from those from other remote control transmitters. Also when only a portion of a remote control signal can be received or when an interference signal contaminates a remote control signal, whereby the code cannot be analyzed properly, the remote control signal is discarded, and it is determined in S303 that a remote control signal has been received completely. Again, it is determined in S305 that the remote control signal is a non-power-requesting signal, whereby the microcomputer 11 transitions to the first power saving mode (S310).

As described above, the power saving device 10 of the present embodiment periodically repeats the normal mode and the second power saving mode while a remote control signal is received and analyzed in the standby state, whereby it is possible to reduce the average power consumption of the microcomputer 11 while receiving a remote control signal.

While a preferred embodiment of the present invention has been described above, it is understood that the present invention is not limited thereto.

The present invention can suitably be used in electronic devices of various applications where a reduction in the standby power consumption is desired, including TV sets, AV devices such as audio devices, AV receivers and DVD players, and personal computers.

What is claimed is:

1. A power saving device operable in a power saving mode and in a normal mode, comprising a controller including an interrupt terminal for receiving a first interrupt signal based on an input remote control signal, wherein:
   during when the first interrupt signal is input to the controller via the interrupt terminal in response to the input remote control signal being received, the controller performs an intermittent operation in which the power saving mode and the normal mode are periodically alternated with each other; and
   the controller ends the intermittent operation when the remote control signal is received completely.

2. The power saving device according to claim 1, wherein the controller stays in the power saving mode until the first interrupt signal is input to the controller via the interrupt terminal.

3. The power saving device according to claim 1, wherein:
   if the remote control signal is a power-requesting signal, the controller stays in the normal mode after the intermittent operation; and
   if the remote control signal is a non-power-requesting signal, the controller stays in the power saving mode after the intermittent operation.

4. The power saving device according to claim 1, wherein:
   the controller includes a main circuit, and a timer circuit for giving a second interrupt signal to the main circuit when the timer circuit has counted a predetermined amount of time; and
   the intermittent operation includes:
   a step in which the timer circuit counts the predetermined amount of time;
   a step in which the controller transitions from the normal mode to the power saving mode;
   a step in which the timer circuit gives the second interrupt signal to the main circuit when the timer circuit has counted the predetermined amount of time; and
   a step in which the controller transitions from the power saving mode to the normal mode when the main circuit receives the second interrupt signal.

5. The power saving device according to claim 2, wherein:
   the controller includes a main circuit, a timer circuit for giving a second interrupt signal to the main circuit when the timer circuit has counted a predetermined amount of time, and an oscillator circuit for supplying a clock signal to the main circuit and the timer circuit;
   the power saving mode until the first interrupt signal is input to the interrupt terminal is a first power saving mode in which the oscillator circuit does not supply a clock signal to the main circuit or the timer circuit; and
   the power saving mode during the intermittent operation is a second power saving mode in which the oscillator circuit does not supply the clock signal to the main circuit but supplies the clock signal to the timer circuit.

6. The power saving device according to claim 1, wherein a period of the intermittent operation is smaller than a period of a code of the remote control signal.

7. The power saving device according to claim 1, wherein the input remote control signal is analyzed in the normal mode during the intermittent operation.

8. A power saving device operable in a power saving mode and in a normal mode, comprising a controller including an interrupt terminal for receiving a first interrupt signal based on an input remote control signal, wherein:
   the controller stays in the power saving mode until the first interrupt signal is input to the controller via the interrupt terminal; and
   during when the first interrupt signal is input to the controller via the interrupt terminal in response to the input remote control signal being received, the controller performs an intermittent operation in which the power saving mode and the normal mode are periodically alternated with each other.

9. The power saving device according to claim 8, wherein:
   the controller includes a main circuit, a timer circuit for giving a second interrupt signal to the main circuit when the timer circuit has counted a predetermined amount of time, and an oscillator circuit for supplying a clock signal to the main circuit and the timer circuit;
   the power saving mode until the first interrupt signal is input to the interrupt terminal is a first power saving mode in which the oscillator circuit does not supply a clock signal to the main circuit or the timer circuit; and
   the power saving mode during the intermittent operation is a second power saving mode in which the oscillator circuit does not supply the clock signal to the main circuit but supplies the clock signal to the timer circuit.

10. The power saving device according to claim 8, wherein the input remote control signal is analyzed in the normal mode during the intermittent operation.

11. An electronic device, comprising:
   a remote control signal receiving circuit for receiving a remote control signal; and
   a microcomputer operable in a power saving mode and in a normal mode, including an interrupt terminal for receiving a first interrupt signal based on the input remote control signal, wherein:
   the microcomputer stays in the power saving mode until the first interrupt signal is input to the microcomputer via the interrupt terminal;
   during when the first interrupt signal is input to the microcomputer in response to the input remote control signal being received, the microcomputer performs an intermittent operation in which the power saving mode and the normal mode are periodically alternated with each other; and the microcomputer ends the intermittent operation when the remote control signal is received completely.

12. The power saving device according to claim 11, wherein the input remote control signal is analyzed in the normal mode during the intermittent operation.

* * * * *